(12) United States Patent
Pan (10) Patent No.: US 8,044,539 B2
(45) Date of Patent: Oct. 25, 2011

(54) INTELLIGENT SOLAR ENERGY COLLECTION SYSTEM

(76) Inventor: Yang Pan, Shanghai (CN)

( * ) Notice: Subject to any disclaimer, the term of this patent is extended or adjusted under 35 U.S.C. 154(b) by 63 days.

(21) Appl. No.: 12/558,614

(22) Filed: Sep. 14, 2009

(65) Prior Publication Data
US 2011/0062787 A1 Mar. 17, 2011

(51) Int. Cl.
*H02J 1/00* (2006.01)
*H02J 3/00* (2006.01)
(52) U.S. Cl. ............ 307/86; 307/71; 362/182; 362/183; 362/192
(58) Field of Classification Search .................. None
See application file for complete search history.

(56) References Cited

U.S. PATENT DOCUMENTS

| | | | |
|---|---|---|---|
| 4,200,904 A | 4/1980 | Doan | |
| 4,445,049 A | 4/1984 | Steigerwald | |
| 4,486,820 A | 12/1984 | Baba et al. | |
| 4,591,965 A | 5/1986 | Dickerson | |
| 4,751,398 A * | 6/1988 | Ertz, III | 307/66 |
| 5,149,188 A | 9/1992 | Robbins | |
| 5,564,816 A * | 10/1996 | Arcadia et al. | 362/183 |
| 5,892,664 A | 4/1999 | Vedder | |
| 6,351,400 B1 | 2/2002 | Lumsden | |
| 6,522,955 B1 * | 2/2003 | Colborn | 700/286 |
| 6,538,343 B1 * | 3/2003 | Stewart | 307/38 |
| 6,784,357 B1 * | 8/2004 | Wang | 136/244 |
| 6,948,826 B2 | 9/2005 | Fogerlie | |
| 2003/0011348 A1 * | 1/2003 | Lof et al. | 322/37 |
| 2003/0204977 A1 | 11/2003 | Hong | |
| 2008/0137327 A1 * | 6/2008 | Hodulik | 362/183 |
| 2009/0040750 A1 * | 2/2009 | Myer | 362/183 |
| 2010/0321930 A1 * | 12/2010 | Watanabe et al. | 362/184 |

FOREIGN PATENT DOCUMENTS
WO WO 2008/013353 A1 * 1/2008
* cited by examiner

*Primary Examiner* — Rexford Barnie
*Assistant Examiner* — Justen Fauth (57) ABSTRACT

A street-lighting and solar energy collection system is disclosed. The system comprises a plurality of lighting/solar energy collecting units, an AC and DC power transmission means and a control unit. The system operates in one of the two operation modes. In the first operation mode as the street-lighting system, the units receive AC power from the power grid for lighting. In the second operation mode as the solar energy collecting system, the units transmit generated DC electricity to a centralized DC to AC converter in the control unit. The control unit further provides a means for switching the system in between two modes. When the system is operated as the solar energy collection system, it is disconnected from the power grid. The generated DC electricity from each unit is converted by the AC to DC converter in the control unit and is subsequently injected into the power grid. Communication devices in the units and in the control unit form an ad hoc communication network. Instructions for operations can be sent from the control unit to the units. Further, the operation status from each unit can be collected and be sent to the control unit.

14 Claims, 8 Drawing Sheets

INTELLIGENT SOLAR ENERGY COLLECTION SYSTEM

CROSS-REFERENCE TO RELATED APPLICATIONS

Not applicable.

BACKGROUND

1. Field of Invention

This invention relates to solar energy collection, specifically to a solar energy collection system based upon a street-lighting system and a power grid.

2. Description of Prior Art

Exterior lighting systems have been used for many applications including streetlights. It is most common to have these exterior lights powered by electricity that has been generated at a remote location either by a hydroelectric power plant, fossil fuel burning power plant or a nuclear power plant. In recent years, concerns have been raised that high demand for electricity taxing the capacity of existing electricity generating plants. Furthermore, concerns regarding the availability and environmental safety of fossil and nuclear fuel are being raised. As a result of the above factors, the price of electricity has been on a path of steady increasing.

Various exterior lighting systems have been devised using solar panel in conjunction with batteries. These exterior lighting systems have been designed such that sunlight impinging on a solar panel charges a battery during the daytime. The battery can subsequently provide a source of electricity for a lighting unit during the nighttime.

Streetlights can be found in abundance throughout the world. Most are in good un-obstructed solar collection locations. Streetlights are already connected to a power grid and have an infrastructure in place for installation, maintenance and service of them. US patent publication 2008/0137327 by Hodulik disclosed a system that adds solar electric power generation to a streetlight which is attached to the power grid. The generated power from the sunlight at daytime is converted into AC power and is sent to the power grid. The streetlight powered by the power grid at nighttime may not need a battery.

SUMMARY OF THE INVENTION

It is therefore an object of the present invention to provide an intelligent solar energy collection system based upon a street-lighting system and a power grid by integrating a plurality of solar energy collection units and an ad hoc communication network in the system.

It is another object of the present invention to provide a low cost solar energy collection system by converting a sub-grid for the street-lighting into a DC power collection system during daytime and by eliminating an inverter locally at each solar energy collection point.

According to one aspect of the present invention, a lighting and solar energy collection system (a sub-grid) comprises a plurality of lighting/solar units, a sub-grid control unit, a power grid, and an AC and DC power transmission means. The lighting/solar units further comprise a lighting unit, a solar energy collection unit, a controller, a switch and a communication device. The sub-grid for the street-lighting and for the solar energy collection is a dedicated grid with two operation modes. In first operation mode, AC power is delivered from the power grid to each unit used for lighting. In the second operation mode, DC electricity generated by each solar energy collection unit is sent to a DC to AC converter in the sub-grid control unit and is subsequently injected into power grid.

According to another aspect of the present invention, each lighting/solar unit has a communication device conforming to a short-range communication standard such as the Bluetooth standard. The sub-grid control unit has a communication device conforming to the same communication standard. During nighttime, the control unit sends an instruction to each unit to operate as a lighting unit powered by AC electricity delivered from the power grid.

During daytime, the sub-grid control unit disconnects the sub-grid from the power grid. The control unit sends an instruction through an ad hoc communication network to disconnect the lighting unit from the sub-grid and to subsequently connect the solar energy collection unit to the sub-grid. The generated DC electricity from the solar energy collection unit is then transmitted to the sub-grid control unit and is converted to AC power through a centralized inverter.

BRIEF DESCRIPTION OF THE DRAWINGS

For a more complete understanding of the present invention and its various embodiments, and the advantages thereof, reference is now made to the following description taken in conjunction with the accompanying drawings.

DETAILED DESCRIPTION

The present invention will now be described in detail with references to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
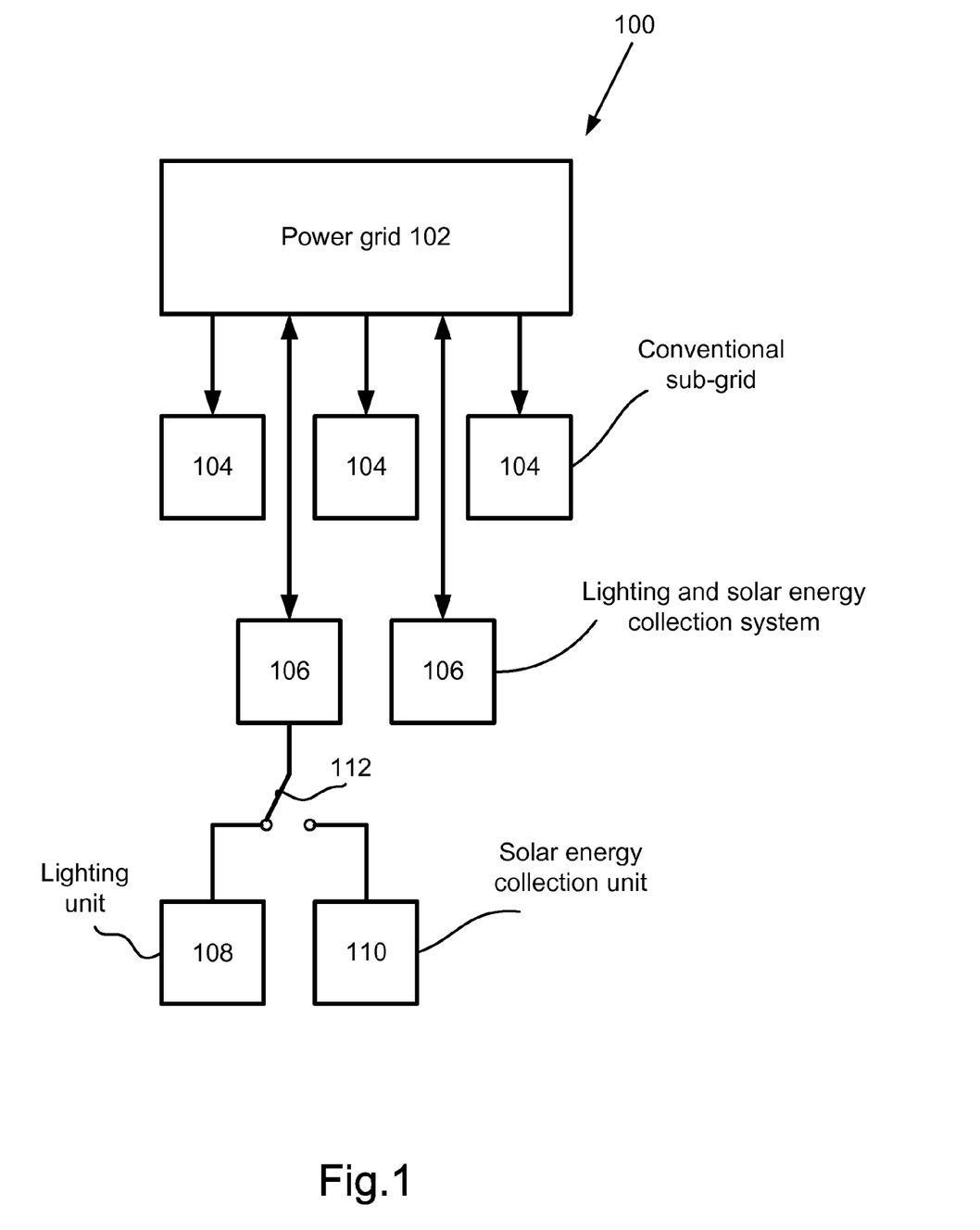
FIG. 1 is a schematic diagram of a power distributing and generating system.

FIG. 1 is a schematic diagram of a power distributing and generating system 100. The system 100 comprises a power grid 102 for distributing the AC power from a power generation plant, a plurality of conventional sub-grids 104 and a plurality of the street-lighting and solar energy collection systems 106. 106 is based upon a dedicated sub-grid connectable to the power grid 102. At nighttime, the AC power is delivered from the power grid 102 to a lighting unit 108 of the system 106. At daytime, DC power generated by the solar energy collecting unit 110 is transmitted to a collection point in 106 and is subsequently injected into the power grid 102. A switch 112 is used to switch the operation of the unit in between the lighting unit and the solar energy collection unit.

Figure 2:
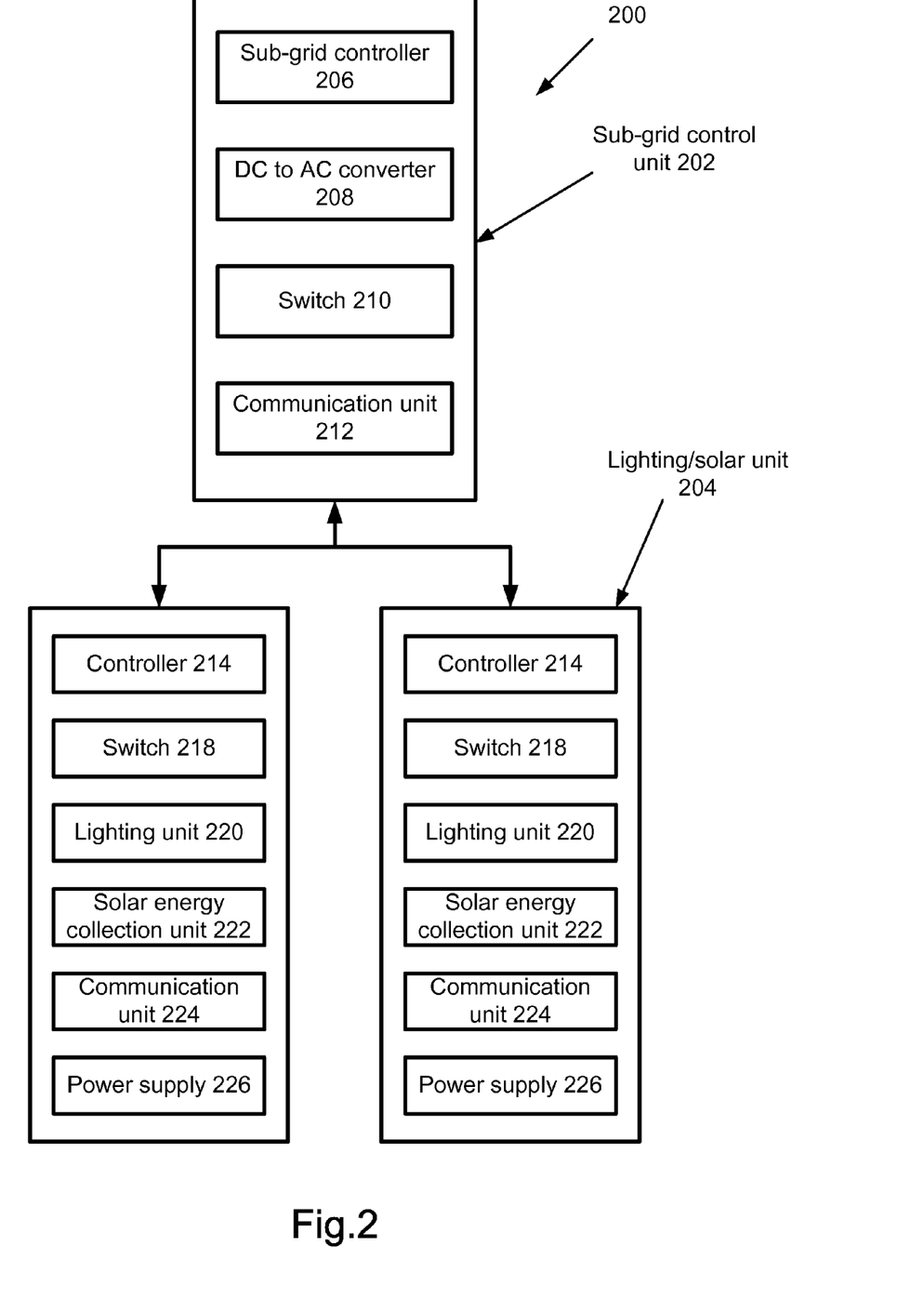
FIG. 2 is a functional block diagram of the lighting/solar units and the sub-grid control unit.

As shown in FIG. 2, The street-lighting and solar energy collection system 106 comprises a sub-grid control unit 202, and a plurality of lighting/solar units 204. A pole is typically used to provide a structural support for the unit 204. The control unit 202 includes a sub-grid controller 206 pertaining to control the operation of the system 106. A DC to AC converter 208 is used to convert collected DC power into AC power. It should be noted that 208 is a centralized unit based upon a conventional inverter as known in the art according to the present invention. It is therefore not necessary to have an inverter for each unit as in prior art. The present inventive concept will save substantially overall cost for collecting solar energy by leveraging the existing infrastructure associated with an existing street-lighting system. A switch 210 is used to connect or disconnect the sub-grid from the power grid according to its operation modes. A communication unit 212 may be a transceiver conforming to the Bluetooth standard in an exemplary case. 212 may further include another transceiver for communicating with an existing communication network such as the Internet.

The lighting/solar unit 204 further includes a controller 214 pertaining to control the operation of the unit. The controller 214 may be a microprocessor in an exemplary case. A switch 218 is used to switch the unit in between two operation modes as the lighting unit 220 or as the solar energy collection unit 222. The solar energy collection unit 222 may be a solar panel. 222 may be a plurality of solar panels. The output of the panel (s) is the DC electricity with a predetermined voltage such as for example 220V for an efficient transmission through the power transmission lines. The power transmission lines may be the existing lines for distributing the AC power. The power transmission lines may also be different lines from the conventional ones for the AC power transmission. A communication unit 224 may be a transceiver conforming to the same communication standard as the communication unit 212 in the sub-grid control unit 202.

The communication unit 212 and a plurality of communication unit 224 embedded in each lighting/solar unit 204 may form an ad hoc communication network. An instruction from the sub-grid control unit 202 may be sent to the controller 214 of each unit through the network. Data generated in the lighting/solar unit 204 may be sent to the sub-grid controller 206 through the network.

A power supply 226 is used to provide power for the operation of the unit 204. The power supply 226 may be a battery. The battery may be re-chargeable by the solar panel 222. Because the power supply 226 is used for powering the controller 214, the switch 218 and the communication unit 224, a conventional battery may be used for a long period of time for the operation of the unit. The battery may not need to be re-charged during a reasonably long lifetime of the operation of the unit.

Figure 3:
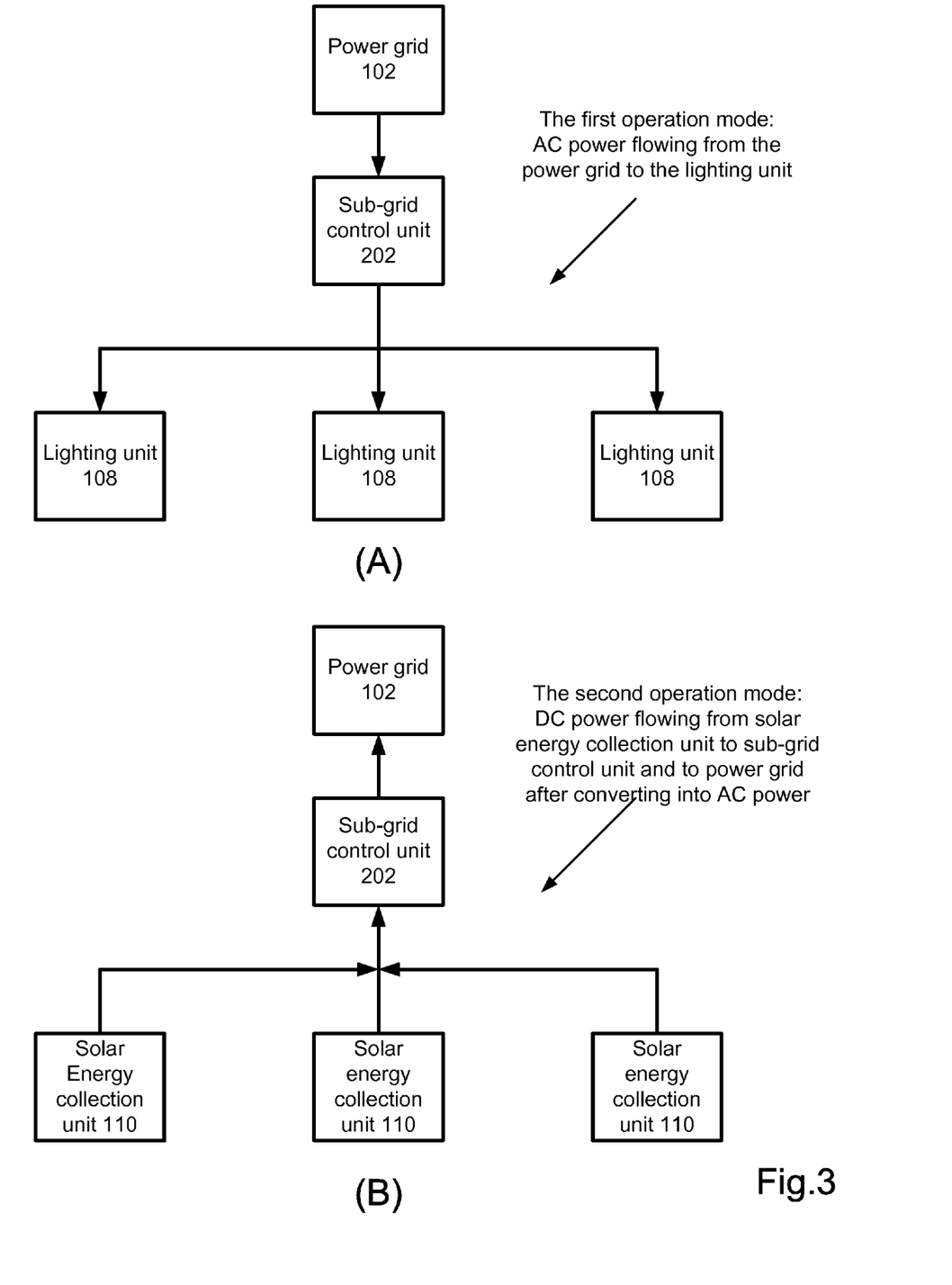
FIG. 3 is a schematic diagram illustrating that AC power flows from power grid to the lighting units during nighttime (the first operation mode) and that DC power flows from the solar energy collection units to the power grid during daytime (the second operation mode).

As shown in FIG. 3, the operation of the street-lighting and solar energy collection system 106 includes two operation modes: the first one for providing street-lighting and the second one for collecting solar energy. FIG. 3A illustrates that the AC power is distributed from the power grid 102 to the lighting/solar unit 204 to provide power for the lighting units. The sub-grid control unit 202 is used for controlling the operation of the system 106. The power grid 102 and the system 106 are operated as a conventional system for providing the power for the street-lighting. It should be noted that the sub-grid is a dedicated grid for the street-lighting according to one aspect of the present invention.

According to the second operation mode as shown in FIG. 3B, the lighting/solar unit 204 is operated as a solar energy collection unit. The unit, exposing to the sunlight, converts the solar energy into the DC current/voltage. The DC power is transmitted to the DC to AC converter 208 in the control unit 202 through the power transmission lines. The DC power is converted into AC power using 208 and is subsequently injected into the power grid 102. The system 106 (sub-grid) is operated as a DC grid when the system is operated in the second operation mode. The sub-grid controller 206 controls an operation of switching the operation modes of the system 106.

Figure 4A:
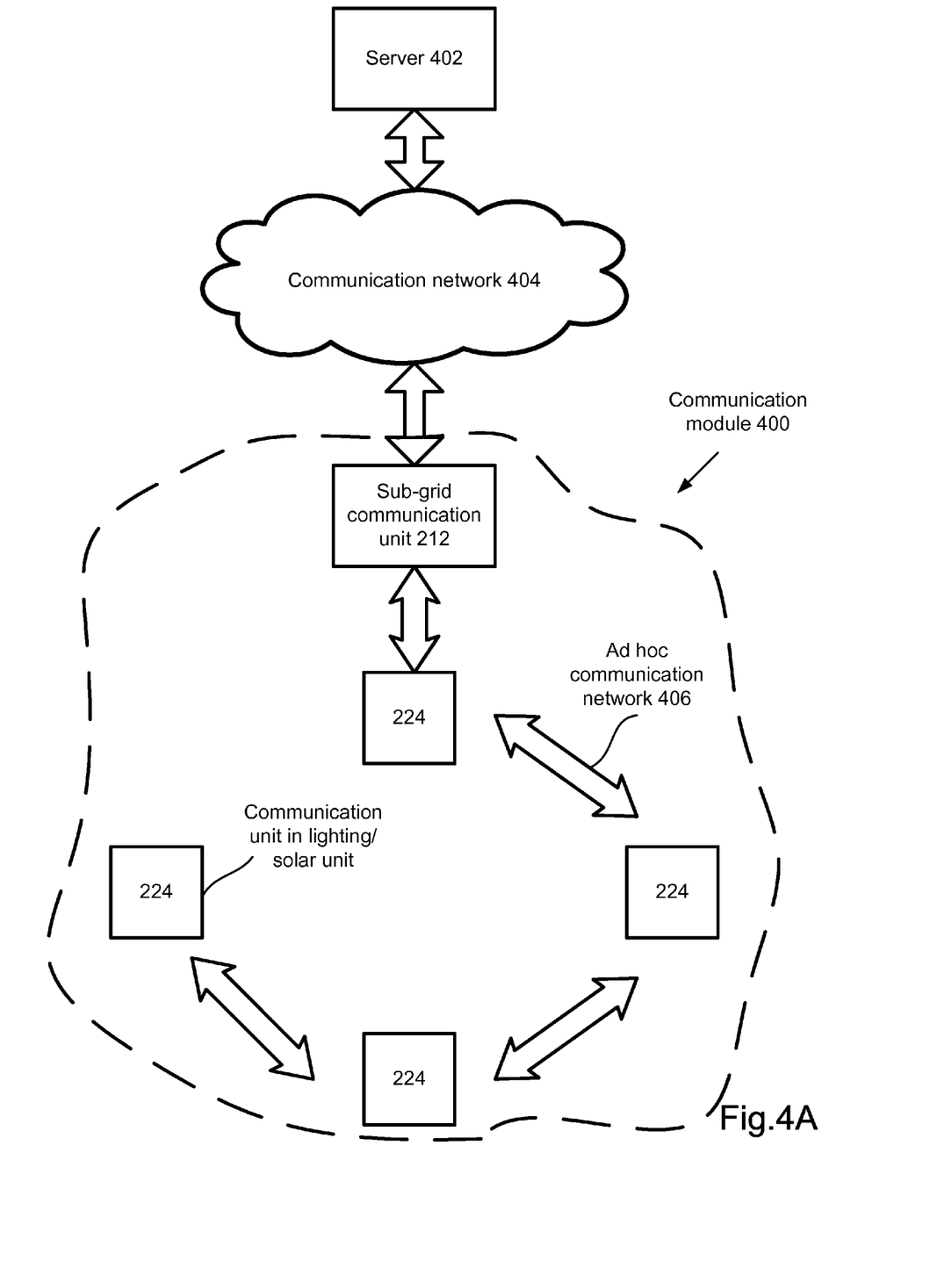
FIG. 4A is a schematic diagram of communication module of the street-lighting and solar energy collection system and the communication module is based upon an ad hoc communication network.

FIG. 4A is a schematic diagram of communication module of the street-lighting and solar energy collection system 106. The communication module 400 comprises a sub-grid communication unit 212 and a plurality of communication units 224 of the lighting/solar unit 204 from which an ad hoc communication network 406 is formed. The communication module 400 may be connected to a server 402 through an existing communication network 404 such as the Internet. The communication network 404 may also be a private communication network. The sub-grid communication unit 212 may comprise two transceivers: one for the ad hoc network and another for the existing communication network.

The ad hoc network may conform to a variety of different short-range communication standards such as the Bluetooth (IEEE 802.11b and its amendments), the ZigBee (IEEE 802.15.4 and its amendments); and the WiFi (IEEE 802.11 and its amendments).

As shown in FIG. 4A, the communication paths may be constructed in a cascaded manner, which reflects a typical configuration of a street-lighting system. A fault tolerance capability is then required to achieve a reliable operation of the communication module 400 and, consequently, of the system 106 in case one or more communication units are malfunction. The high reliability of the communication module 400 may be achieved by configuring the communication paths in a manner that a communication unit may be able to be connected to more than the most nearby units. By implementing such a scheme, the malfunction of a single or a few communication units will not impose an operation issue for the system. Further, the sub-grid control unit 202 is able to monitor the functionalities of each unit through 212 by receiving (or not receiving) a status report from each communication unit 224.

Figure 4B:
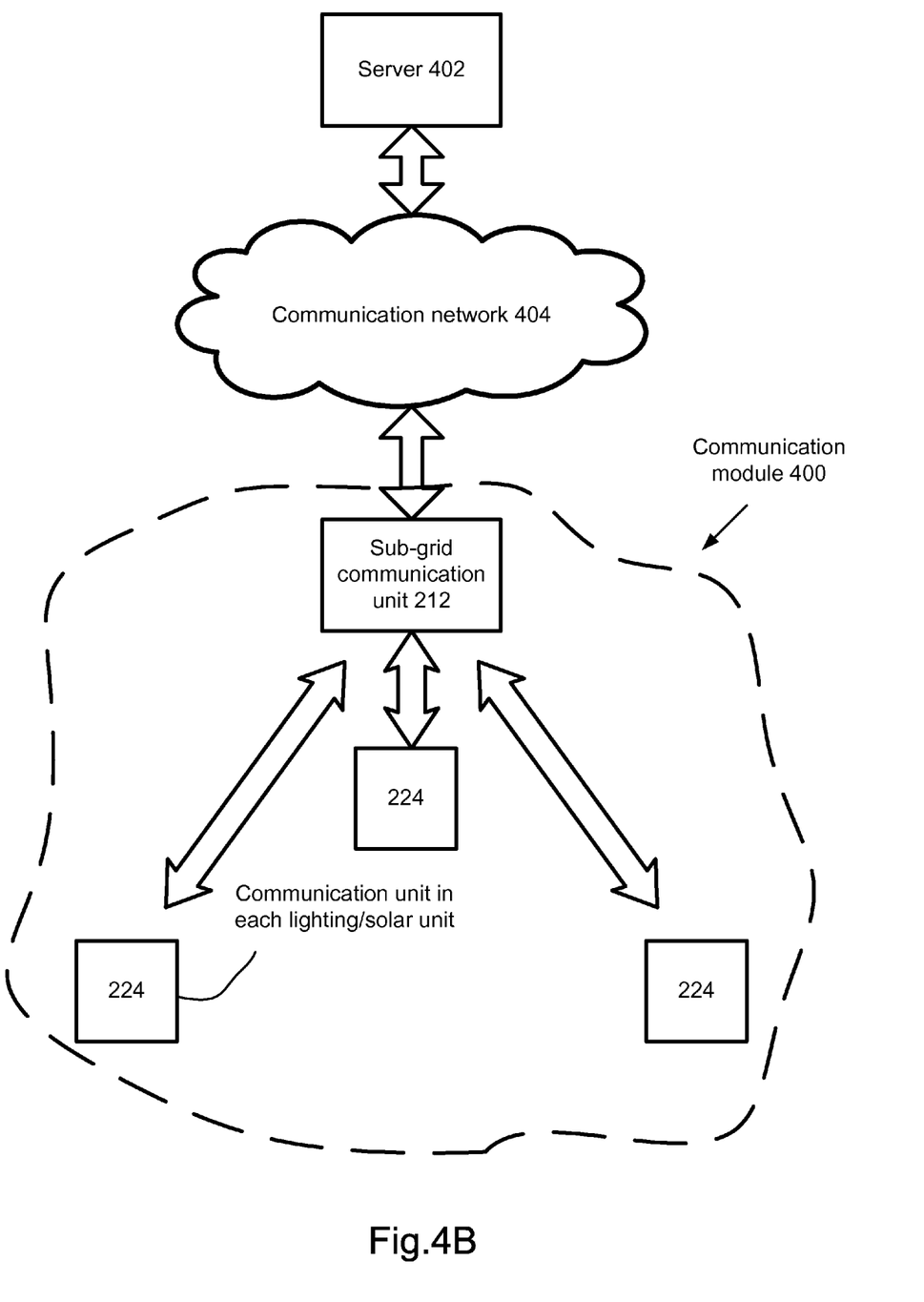
FIG. 4B is a schematic diagram of communication module of the street-lighting and solar energy collection system and the communication module is based upon an existing communication network.

As shown in FIG. 4B, the communication between the sub-grid communication unit 212 and the communication units of 224 may be configured in multiple parallel paths. An instruction is broadcast by 212 and is received by various units of 224. For such an implementation, the communication network may be a part of an existing communication network such as an existing network for telephone or the Internet. The communication module 400 is not impacted by any single or a combination of multiple unit failure. The lighting/solar units, however, may consume more battery power in such an implementation.

Figure 5:
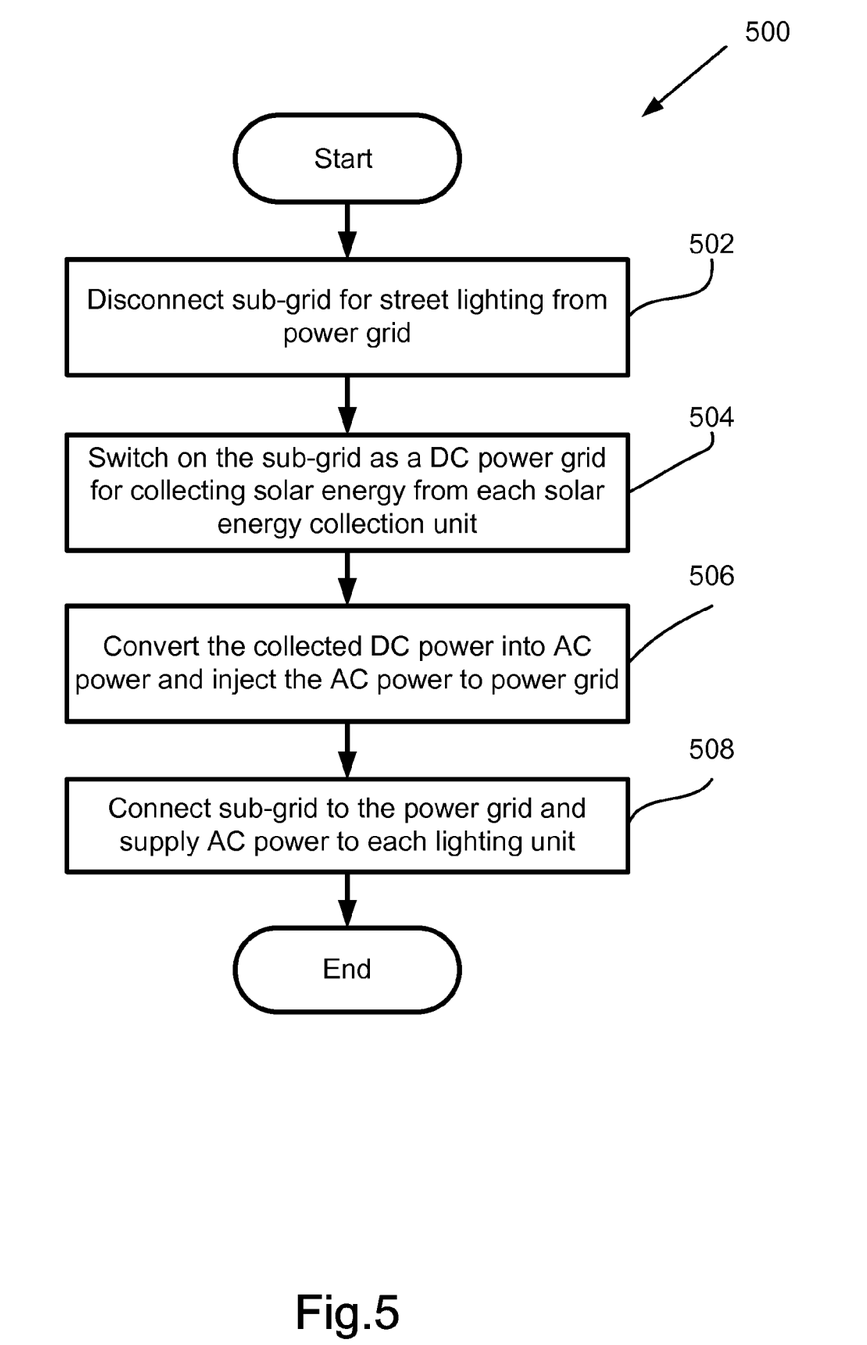
FIG. 5 is a flow diagram depicting steps of operations of the street-lighting and solar energy collection system.

FIG. 5 is a flow diagram depicting steps of operations of the street-lighting and solar energy collection system 106. Process 500 starts with step 502 that the system (sub-grid) 106, operating in the first operation mode as the street-lighting system, is disconnected from the power grid 102. The operation is controlled by the sub-grid control unit 202. An instruction is then sent to every unit 204 in the system through the communication network to disconnect the lighting unit 220 from and to connect the solar energy collection unit 222 to the sub-grid. In step 504, the system (sub-grid) 106 is switched on as a DC power grid for collecting DC electricity generated from the solar energy from each unit. The collected DC electricity is transmitted to the sub-grid control unit 202. The DC power is converted into AC power in step 506 by the use of the DC to AC converter 208 and the AC power is subsequently injected into the power grid 102. The system 106 continues to operate in the second operation mode as the solar energy collection system until an instruction is sent out from the control unit 202 to switch the operation mode. In step 508, the system (sub-grid) 106 is reconnected to power grid 102 as the street-lighting system.

Figure 6:
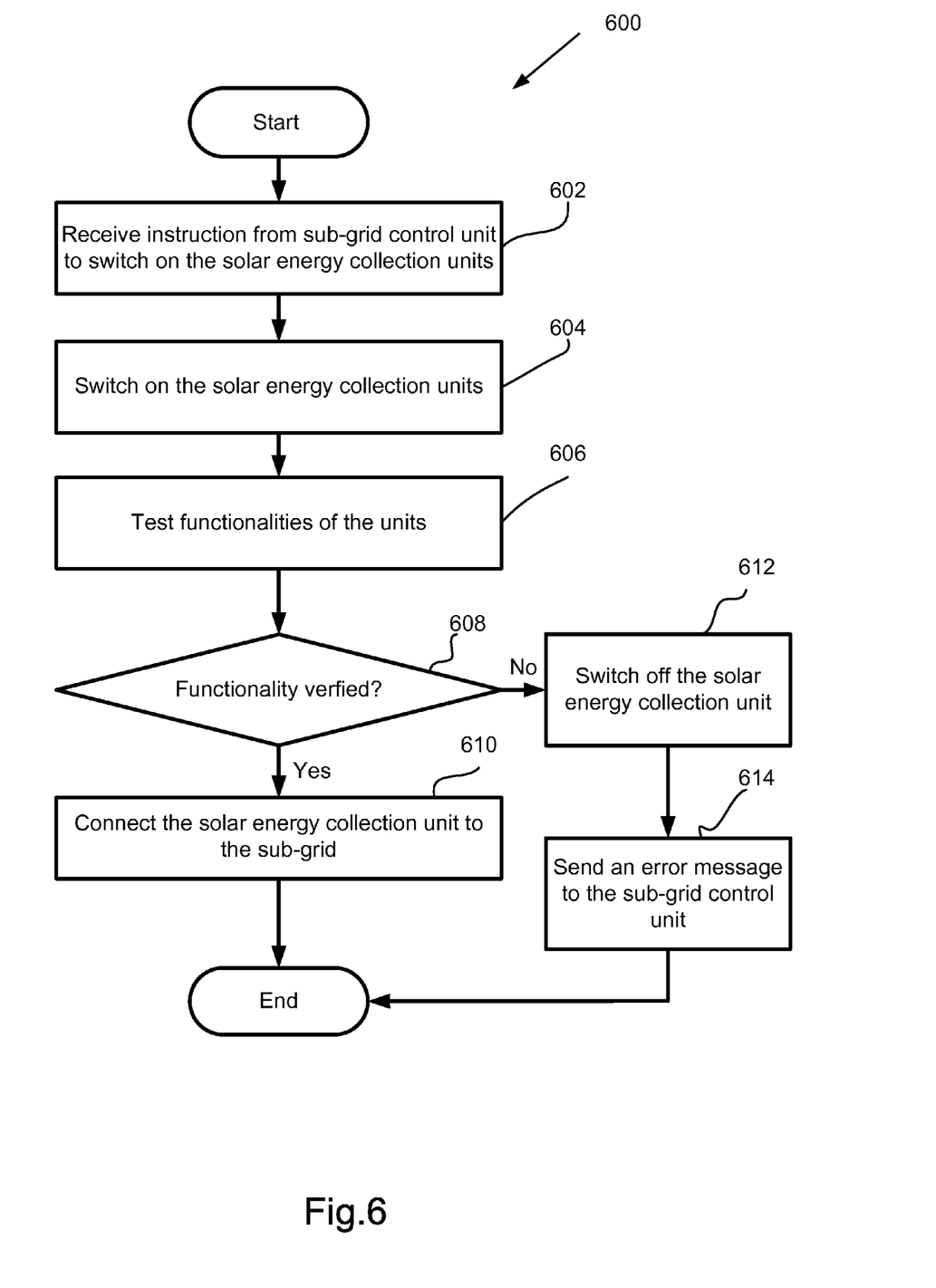
FIG. 6 is a flow diagram depicting steps of operations that functionalities of each solar energy collection unit are tested before the unit is connected to the sub-grid.

FIG. 6 is a flow diagram depicting steps of operations that functionalities of each solar energy collection unit 222 are tested before the unit is connected to the sub-grid 106. Process 600 starts with step 602 that an instruction is received by each unit 204. The controller 214 in each unit switches on the solar collection unit 222 in step 604 after receiving the instruction. Functionalities of 222 are tested in step 606 by such as measuring the generated current and voltage from sunlight by solar panels. The data collected is analyzed by the controller 214 of the unit. If the functionalities are tested as normal in step 608, the solar energy collection unit 222 is connected to the sub-grid 106 in step 610. Otherwise, the fault unit is switched off in step 612 and an error message is sent in step 614 to the sub-grid control unit 202 through the established ad hoc network 406.

Figure 7:
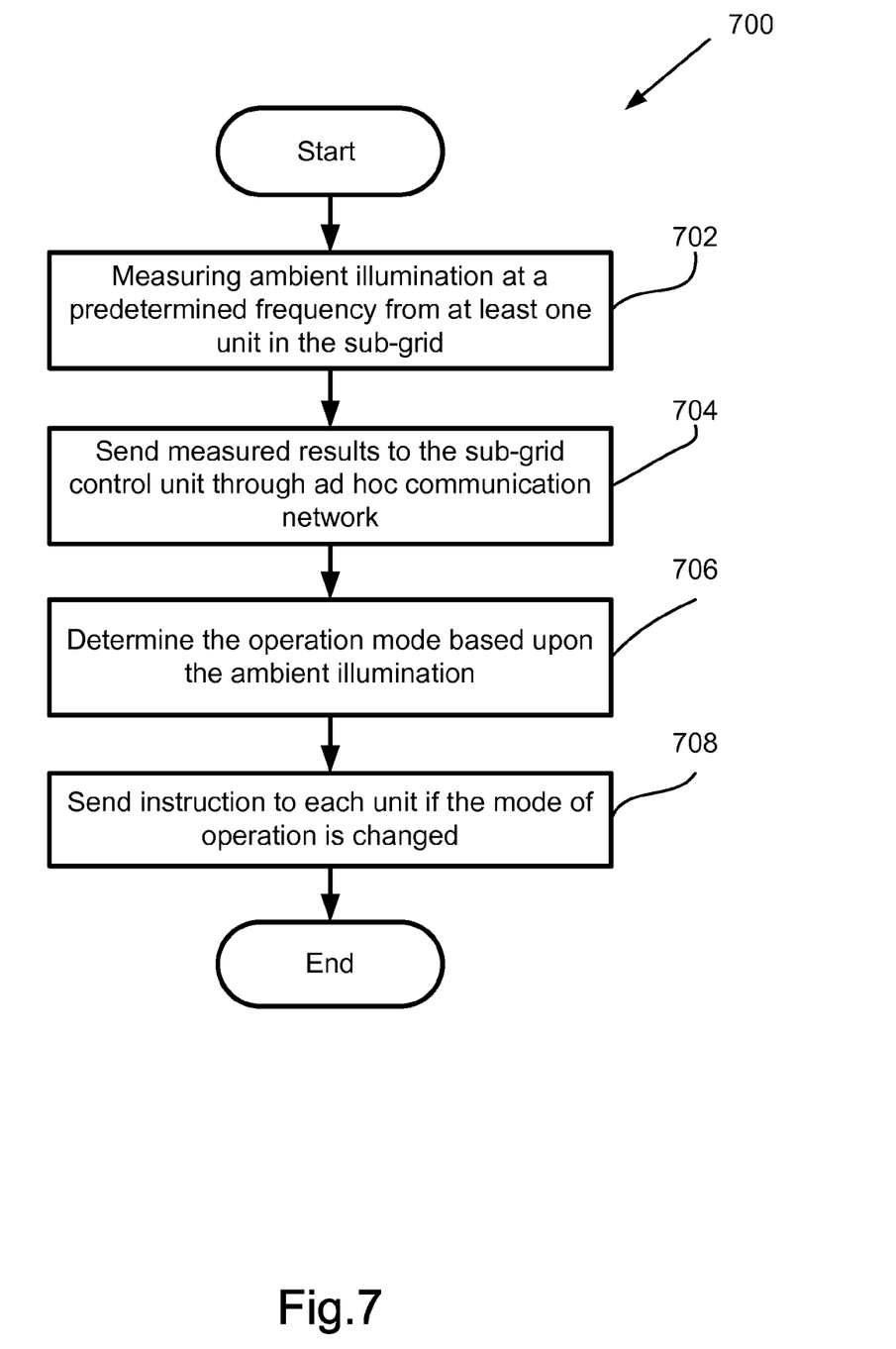
FIG. 7 is a flow diagram depicting steps of operations of the street-lighting and solar energy collection system with an ambient illumination detector. The operation mode of the system is determined based upon the measured results.

FIG. 7 is a flow diagram depicting steps of operations of the street-lighting and solar energy collection system 106 with an ambient illumination detector installed in at least one lighting/solar unit 204. The operation mode of the system is determined based upon the measured results. Process 700 starts with step 702 that the ambient illumination is measured by the use of a photodiode in an exemplary case. The photodiode may be installed in one unit. The photodiode may also be installed in multiple units. The photodiode may be a separated device. The photodiode may also be an integrated part of the controller or the solar panels or any other part of the unit. When the instruction is received to test the ambient illumination, the lighting unit 220 may be switched off (if it has been switched on when the instruction is received) temporarily to improve the measurement accuracy. The testing may be programmed at a predetermined frequency and be executed by the controller 214. At daytime the measured illumination is typically high and at the nighttime the measured illumination is low. The measured results are sent to the sub-grid control unit 202 through the ad hoc communication network 406 in step 704. The operation mode is determined in step 706 by the sub-grid controller 206 based upon the received results. According to another implementation of the present invention, the measured data may be sent further to the server 402 through the existing communication network 404. If the operation mode is determined to be changed, the updated (changed) mode is subsequently sent to each unit from the control unit 202 in step 708.

The invention claimed is:

1. A street-lighting and solar energy collection apparatus connected to a centralized DC to AC converter for injecting converted AC power to a power grid, the system comprising:
    a. a lighting unit;
    b. a solar energy collection unit;
    c. a control unit;
    d. a switch controlled by the control unit for switching operations of the apparatus in between providing lighting and collecting solar energy;
    e. a communication device for communicating with a similar device in a similar apparatus located within a predetermined distance from the apparatus and/or for communicating with an external control station; and
    f. a power supply for powering the control unit, the switch and the communication device,
        wherein said centralized DC to AC converter may be shared by a plurality of similar apparatus located in different locations.

2. The apparatus as recited in claim 1, wherein said communication device further comprising a transceiver conforming to a standard or a combination of standards from the following group:
    a. ZigBee;
    b. Bluetooth; and
    c. Wi-Fi.

3. The apparatus as recited in claim 1, wherein said communication device may be a node of an ad hoc communication network formed by a plurality of similar communication devices included in a plurality of similar apparatus.

4. The apparatus as recited in claim 1, wherein said control unit further comprising a data processor pertaining to control operations of the apparatus based upon at least partially instructions received by the communication device from said external control station.

5. The apparatus as recited in claim 1, wherein said apparatus may be installed as a part of a street-lighting system.

6. The apparatus as recited in claim 1, wherein said power supply further comprising a battery, wherein the battery may be rechargeable by the solar energy collecting unit.

7. The apparatus as recited in claim 1, wherein said solar energy collection unit further comprising a solar panel or a plurality of solar panels.

8. A street-lighting and solar energy collection system including at least one centralized DC to AC converter connectable to a power grid, the system comprising:
    a. a plurality of lighting/solar energy collection units, wherein said system provides a means for street lighting by the lighting units in first operation mode, and said system provides a means for collecting solar energy by the solar energy collection units in second operation mode;
    b. a transmission means further comprising AC power lines for transmitting AC power from the power gird to the lighting units in said first operation mode, and DC power lines for transmitting DC power generated by the solar energy collection units to said centralized DC to AC converter in said second operation mode, wherein said DC power lines may comprise said AC power lines;
    c. a control unit providing a means of switching the system in between the first and the second operation modes.

9. The system as recited in claim 8, wherein said each lighting and solar energy collection unit further comprising:
    a. a switch for switching of the unit's operation in between providing lighting and collecting solar energy;
    b. a controller providing a means of controlling the switching operation of the switch;
    c. a communication device for communicating with similar communication devices in other lighting and solar energy collection units; and
    d. a power supply unit including a battery.

10. The system as recited in claim 9, wherein said communication device further comprising a transceiver conforming to a standard or a combination of standards from the following group:
  a. ZigBee;
  b. Bluetooth; and
  c. Wi-Fi.

11. The system as recited in claim 9, wherein said battery may be chargeable by the solar energy collection unit.

12. The system as recited in claim 8, wherein said control unit further comprising:
  a. a controller for controlling operation of the control unit;
  b. a switch for connecting or disconnecting said system from the power grid; and
  c. a communication device for communicating at least to one communication device in one lighting and solar energy collection unit.

13. The system as recited in claim 12, wherein said communication device in said control unit comprising at least a communication means conforming to the same communication standard as the communication devices in the lighting and solar energy collection units.

14. The system as recited in claim 8, wherein said transmission means comprising existing power transmission lines of an existing street lighting system.

* * * * *